(12) United States Patent
Herrmann

(10) Patent No.: US 6,636,809 B1
(45) Date of Patent: Oct. 21, 2003

(54) HIGH RESOLUTION RADON TRANSFORM SEISMIC TRACES PROCESSING

(75) Inventor: Philippe Charles Herrmann, Alberta (CA)

(73) Assignee: Compagnie Generale de Geophysique (FR)

(*) Notice: Subject to any disclaimer, the term of this patent is extended or adjusted under 35 U.S.C. 154(b) by 0 days.

(21) Appl. No.: 09/720,950

(22) PCT Filed: May 3, 2000

(86) PCT No.: PCT/IB00/00659

§ 371 (c)(1),
(2), (4) Date: Jan. 3, 2001

(87) PCT Pub. No.: WO00/67045

PCT Pub. Date: Nov. 9, 2000

Related U.S. Application Data

(60) Provisional application No. 60/132,211, filed on May 3, 1999.

(51) Int. Cl.[7] .................................................. G01V 1/30
(52) U.S. Cl. .......................................................... 702/17
(58) Field of Search ....................... 702/14, 17; 367/38, 367/45

(56) References Cited

U.S. PATENT DOCUMENTS 5,138,583 A * 8/1992 Wason et al. .................. 702/17
5,909,655 A * 6/1999 Canadas et al. ............... 702/17

* cited by examiner

*Primary Examiner*—Donald E. McElheny, Jr.
(74) *Attorney, Agent, or Firm*—Duane Morris LLP

(57) ABSTRACT

The present invention comprises a non-iterative method of processing seismic traces. A constrained High Resolution Radon decomposition is performed at various frequencies in which the Radon decomposition at a given frequency is constrained as a function of the Radon decomposition at at least a lower frequency. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

7 Claims, 6 Drawing Sheets

(3 of 6 Drawing Sheet(s) Filed in Color)

---

PERFORM A CONSTRAINED, HIGH RESOLUTION RADON DECOMPOSITION AT VARIOUS FREQUENCIES

CONSTRAIN RADON DECOMPOSITION AT A GIVEN FREQUENCY AS A FUNCTION OF AT LEAST THE RADON DECOMPOSITION AT A LOWER FREQUENCY

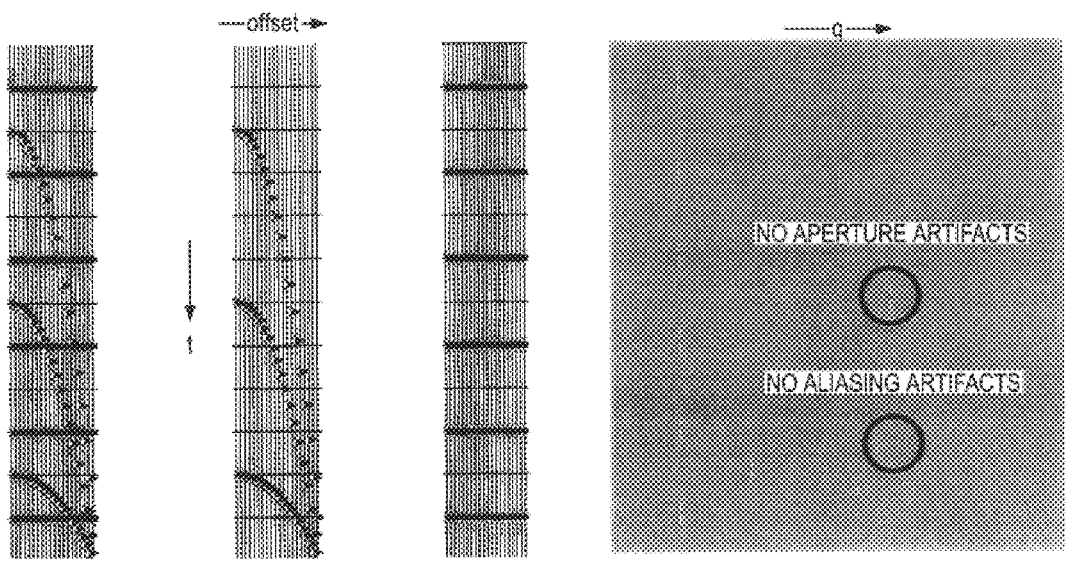
*FIG. 4a*  *FIG. 4b*  *FIG. 4c*  *FIG. 4d*

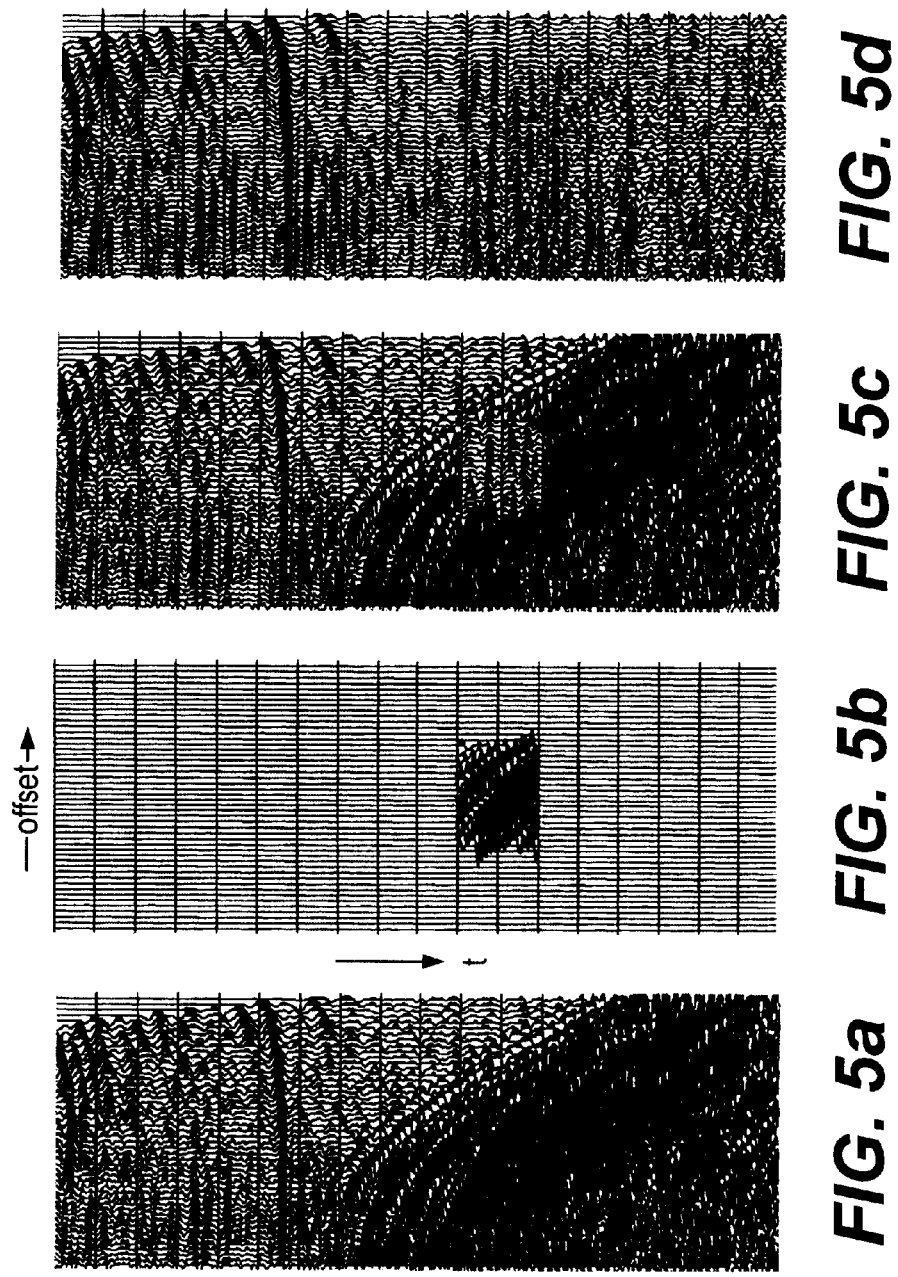

HIGH RESOLUTION RADON TRANSFORM SEISMIC TRACES PROCESSING

This application claims the benefit of Provisional application Ser. No 60/132,211, filed May 3, 1999.

BACKGROUND OF THE INVENTION

1. Field of the invention

This invention relates to an improved high resolution Radon transform for use in analysing geophysical data.

2. Description of the Prior Art

The widespread use of multiple removal in the parabolic Radon domain (Hampson, 1986, Kostov, 1990) is related to its effectiveness and efficiency for most situations. However, when applied under severe conditions reduced spatial aperture (FIGS. 1a–f) and/or coarse offset sampling (FIGS. 2a–c), one may observe a poor focusing of the events in the parabolic Radon domain, combined with severe allasing artifacts. As a consequence, the multiple model loses some multiple energy and include significant primary energy. Once the multiple model is substracted from the input data, this leads to poor multiple removal and deteriorate primaries (see FIGS. 3a–d for illustration).

De-aliased Hiqh-Resolution (DHR) Radon Transform

Finite spatial aperture limits the resolution of the Radon transform, while finite spatial sampling introduces aliasing artifacts. To overcome these limitations one has to constrain the parabolic decomposition of the data. This issue was first investigated by Thorson and Claerbout, 1985. More recently Sacchi and Ulrych, 1995, Hugonner and Canadas, 1997, and Cary, 1998 have developed high-resolution Radon transforms (in the frequency-space or time-space domain). These constrain the Radon spectra to be sparse in q and t, using a re-welghted iterative approach.

However, such an iterative approach presents the major drawback of being very much time and computer consuming.

SUMMARY OF THE INVENTION

The present invention is directed toward a novel method that has the advantage of not being an iterative process.

Going back to the previous synthetic example (FIGS. 3a–c), the following observations can be made:

1. Due to the curvature range involved in this example and the parabolic sampling rate chosen, 550 parabolas are used to perform the parabolic decomposition of 15 traces. That is an under-determined least-squares problem.

2. Among the 550 parabolas, only 4 are actually needed to properly decompose the data. Constraining the parabolic decomposition of the data onto these four parabolas will lead to well-focused parabolic Radon spectra. One then has to solve a constrained underdetermined least-squares problem.

3. At low frequencies, the steering vectors used for the parabolic decomposition do not suffer from aliasing (FIG. 2b). As a consequence the parabolic decomposition at low frequencies can be used to guide the parabolic decomposition at higher frequencies.

To handle this constrained under-determined least-squares problem, the invention proposes a data driven constrained Radon decomposition. The Radon decomposition at a given frequency $\omega_k$ is constrained around the most significant spectral components highlighted at the previous frequency $\omega_{k-1}$. This non-iterative, gradual way (from low frequencies to high frequencies) to build the constrain enables to enhance the resolution of the Radon spectra. This algorithm enables to go beyond the commonly admitted sampling and aperture limitations. The task of the proposed method is simplified when the data to decompose are solely composed of a small amount of Radon components. On actual data this approach is therefor more effective using sliding temporal and spatial windows.

More generally, the invention proposes a method of performing a processing on seismic traces comprising the step of performing a constrained High Resolution Radon decomposition at various frequencies, wherein the Radon decomposition at a given frequency is constrained as a function of the Radon decomposition at at least a lower frequency.

More particularly, it proposes a method wherein a Radon decomposition is successively performed at various sparse frequencies, from the lower frequency to the higher, the Radon decomposition at a given frequency being constrained as a function of the Radon decomposition at the previous frequency.

Other features and advantages of the invention will be further understood in view of the following description.

DESCRIPTION OF THE DRAWINGS

The patent or application file contains at least one drawing executed in color. Copies of this patent or patent application publication with color drawing(s) will be provided by the Office upon request and payment of the necessary fee.

FIG. (2a) depicts a parabolic event for 0<f<90 Hz—same parabolic event at 5 Hz (2b) and at 70 Hz (2c). Due to the finite spatial sampling, spatial aliasing patterns appear, leading to a non-unique parabolic decomposition of this monochromatic wave-field. The parabolic decomposition must be constrained by the parabolic decomposition at lower frequencies.

FIG. (3a) depicts a simulated NMO-corrected CMP gather. (3b) Multiple model obtained using regular parabolic Radon transform: we observe the presence of primary energy. (3c) Estimated primaries ((3a)–(3b)): note the deterioration of the primary energy and the remaining multiple energy. (3d) Regular parabolic Radon spectra.

FIG. (4a) depicts the same simulated NMO-corrected CMP gather. (4b) Multiple model obtained using DHR parabolic Radon transform. (4c) Estimated primaries ((4a)–(4b)), note the perfect multiple removal without damaging the primaries. (4d) DHR parabolic spectra.

FIG. (5a) depicts an NMO-corrected CMP gather from deep offshore exploration. (5b) Multiple model estimated from a windowed portion of the CMP gather. (5c) estimated primaries ((5a)–(5b)). (5d) Estimated primaries after moving the sliding window all over the CMP gather.

Figure 6:
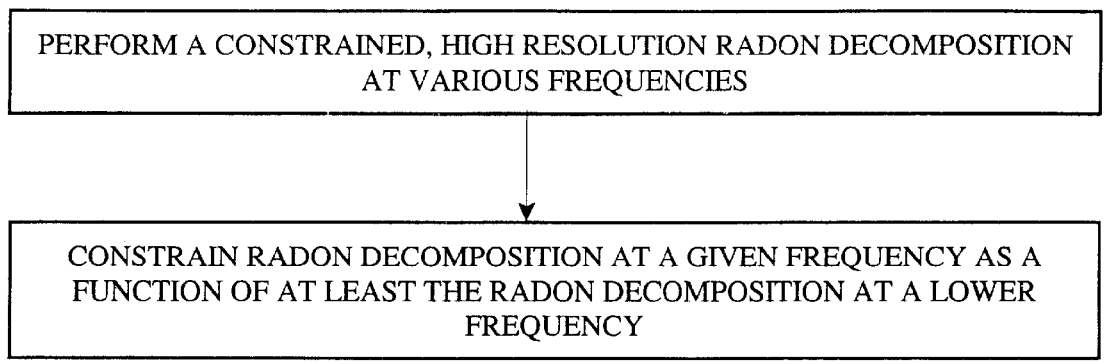

FIG. 6 is a flowchart of an exemplary method of the present invention.

DESCRIPTION OF THE PREFERRED EMBODIMENTS

It is now described how De-aliased, High-Resolution (DHR) Radon spectra may be constructed with a direct approach avoiding the disadvantages associated with the iterative high-resolution Radon transform of the prior art.

Figures 1A, 1B, 1C, 1D, 1E, 1F:
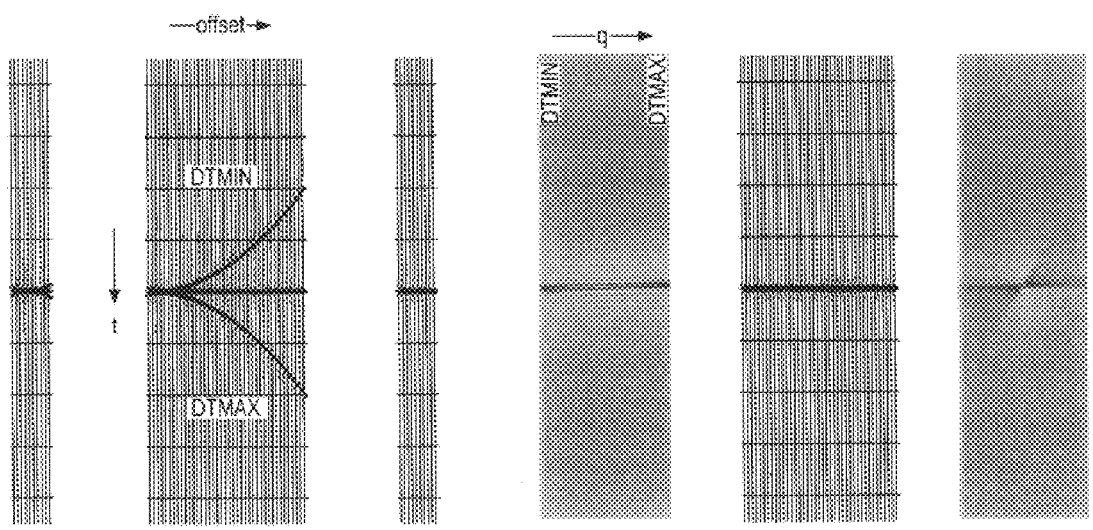
FIGS. 1a–b depicts the effects of the aperture limitation on the discrimination of three parabolic events.
FIGS. 1e–f depicts the horizontal event resolution in the parabolic Radon domain (1d, 1f) as a function of the spatial aperture (1c, 1e). The origin of the 'bufferfly' looking artifact in (1f) can be found in (Kabir and Marfurt, 1999).
Figure 2C:
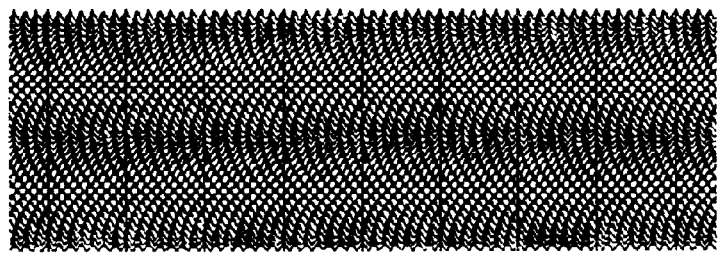
Figure 2B:
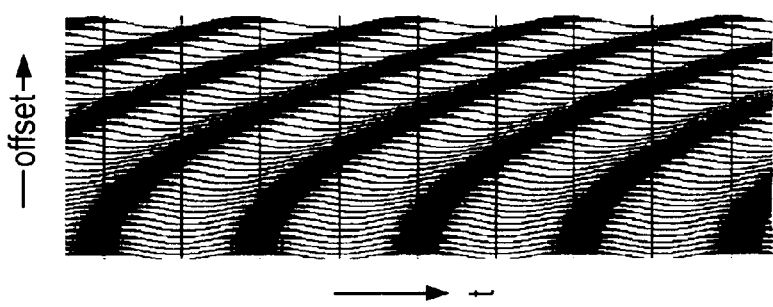
Figure 2A:
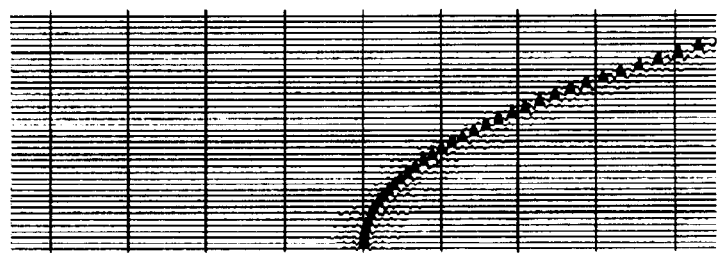
Figures 3A, 3B, 3C, 3D:
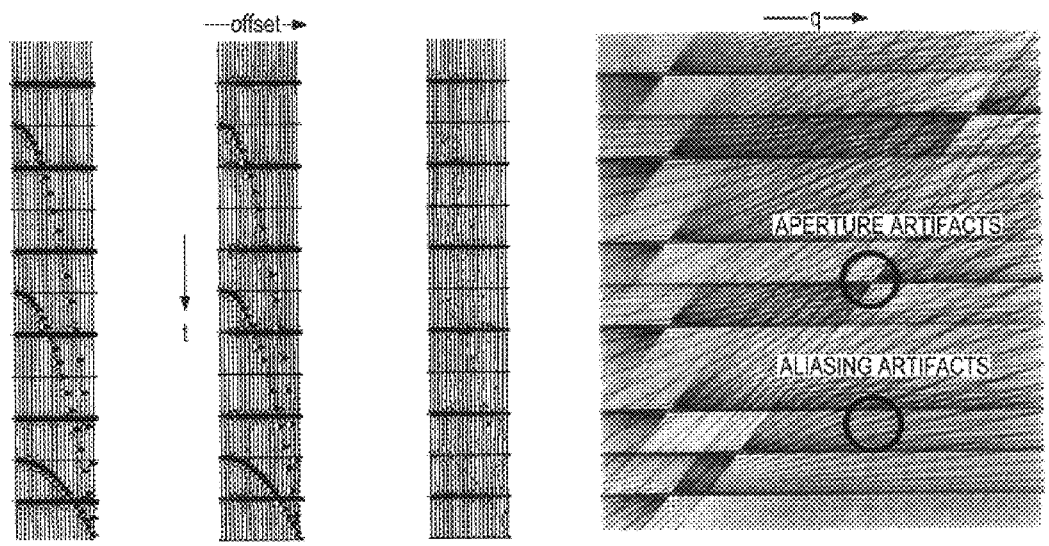

The Radon transform (linear of parabolic) allows to decompose a complex, signal as a sum of elementary signals with simpler spatial behaviors (linear or parabolic). Once the signal is decomposed in the Radon space, some of its spectral components can be filtered out in order to remove some unwanted coherent (linear or parabolic) components of the signal. The effectiveness of the signal filtering in the Radon domain relies on the quality of the Radon transform: its ability to uniquely decompose the signal (Radon spectra). The uniqueness of the Radon decomposition is altered when the number of spectral components involved in the Radon transform exceeds the number of signal components. As a consequence of this non-uniqueness aliasing patterns appear in the Radon spectra. This aliasing phenomena is illustrated with FIG. (3d), which represents the result of the decomposition on 15 traces NMO-corrected (FIG. 3a) over 550 parabolas. The nine parabolas contained in the input signal have not been uniquely decomposed, leading to unfocused Radon spectra.

In order to enhance the resolution of the Radon spectra one has to constrain the parabolic decomposition of the signal onto its most significant spectral. components. How to define and apply these constrains is now described.

For efficiency reasons the Radon decomposition is often performed in the frequency domain. Given a frequency component $\omega_k$, the following equality relates the recorded data to its spectral components:

$$\bar{d}(\omega_k) = G(\omega_k)\bar{q}(\omega_k) \tag{1a}$$

with $\omega_k$, the $k^{th}$ frequency component, $\bar{d}(\omega_k)$ the data vector to decompose (M: number of available data samples), $$\bar{d}(\omega_k) = (d_1(\omega_k), \ldots, d_M(\omega_k))^T \tag{1b}$$

$\bar{q}(\omega_k)$, the spectral vector containing the N Radon spectral components over which the data vector is decomposed, $$\bar{q}(\omega_k) = (q_1(\omega_k), \ldots, q_N(\omega_k))^T \tag{1c}$$

$G(\omega_k)$ the (M, N) complex matrix made of the Radon steering vectors, $$G_{m,n}(\omega_k) = e^{j\omega_k q_n x_m} \text{ (Linear Radon transform)} \tag{1d}$$

$$G_{m,n}(\omega_k) = e^{j\omega_k q_n x_m^2} \text{ (Parabolic Radon transform)} \tag{1e}$$

($x_m$: spatial co-ordinate at which $d_m(\omega_k)$ is recorded).

The Radon decomposition of the data is usually obtained using the over-determined Least-squares solution to (1a), $$\bar{q}(\omega_k) = (G^H(\omega_k)G(\omega_k) + \epsilon I)^{-1} G^H(\omega_k)\bar{d}(\omega_k) \tag{2a}$$

with $\epsilon$ a pre-whitening factor to avoid numerical instabilities and I the (N, N) identity matrix.

In order to constrain the Radon decomposition onto the most significant spectral components of the data, it is proposed to compute the Radon decomposition using the constrained under-determined Least-squares solution to (1a), $$\bar{q} = W(\omega_k)G^H(G^H W(\omega_k)G + \epsilon I)^{-1} G^H \bar{d} \tag{2b}$$

with $W(\omega_k)$ (N, N) a real diagonal positive definite constrain matrix, that will focus the Radon decomposition around the most significant spectral components of the data.

How to fill the W diagonal matrix will now be described.

Assuming, non-disperse signals, the Radon amplitude spectra's has some sort of continuity from one frequency to another one. This observation is used to constrain the Radon spectra at frequency $\omega_k$ with the Radon spectra derived at the previous frequency $\omega_{k-1}$. Therefore the constrain matrix $W(\omega_k)$ reads, $$W_{i,i}(\omega_k) = \|q_i(\omega_{k-1})\| i=1, \ldots, N \tag{3}$$

It will be readily understood that with such a constrain matrix $W(\omega_k)$, equation (2b) can easily be solved using for example the algorithm proposed by Sacchi and Ulrych.

After the processing of the Radon decomposition, the data are filtered in the Radon space to substract the multiples and an inverse parabolic or linear Radon transform is performed to obtain the estimated primaries.

This non-iterative, gradual way (from low frequencies to high frequencies) to update the constrain matrix enables to enhance the resolution of the Radon decomposition and to avoid a large amount of aliasing artifacts.

In particular, as clearly shown by the example displayed on FIGS. 4a–4d without a prioi information on the curvature of the multiples, this non-iterative process focuses the parabolic decomposition of the data onto its most significant spectral components. The application of this method to the previous synthetic data example leads to remarkable results (FIGS. 4a–d), including a sparse parabolic decomposition of the data along the q and τ axis, leading to perfect multiple removal with no damage to the primaries.

Application to Real Data

The task of the proposed method is simplified when the data are solely composed of a small number of parabolas. On actual data this approach is more effective using sliding temporal (200 ms) and spatial windows (18 traces) as displayed in FIGS. 5a–d. This example nicely illustrates the ability of the algorithm to separate, on a limited number of traces, primaries from multiples with large move-out The algorithm has gone beyond the usual sampling and aperture limitations.

The proposed non-iterative De-aliased, High Resolution Radon transform of the present invention provides an alternative to the traditional Radon transform when one has to handle severe circumstances; small spatial aperture, insufficient spatial sampling, large or small move-out difference between primaries and multiples. Working on limited spatial and temporal windows, the wave-field is readily decomposed into its main parabolic components using the present invention.

REFERENCES

Cary, P., 1998. The simplest discrete Radon transform. Extended Abstracts, Vol. II, p. 1999–2002.

Hampson, D., 1986. Inverse, velocity stacking for multiple elimination. J. Can. SEG, 22, p. 44–45.

Hugonnet, P. and Canadas, G., 1997. Regridding of irregular data using 3D Radon Decompositions: SEG Extended Abstracts, Vol. II, p. 1111–1114.

Kabir, M. M. N. and Marfurt, K. J., 1999. Toward true amplitude multiple removal. The leading Edge, Vol. 18n N1, p. 66–73.

Kostov, C., 1990. Toeplitz structure in Slant-Stack Inversion: SEG Abstract Vol. II, p. 1647–1650.

Sacchi, M. D. and Ulrych, T. J., 1995. High resolution velocity gathers and offset-space reconstruction: Geophysics, 60, 1169–1177.

Sacchi, M. D., SEG Expanded Abstracts 1999, Fast High resolution parabolic Radon Transform.

Spitz, S., 1991. Seismic trace interpolation in the F-X domain. Geophysics, Vol. 56, N6, p. 785–794.

Tarabtola, A., 1987. Inverse Problem Theory Elsevier.

Thorson, J. R. and Claerbout, J. F., 1985. Velocity-stack and slant-stack stochastic inversion: Geophysics, 50, p. 2727–2741.

The foregoing disclosure and description of the invention are illustrative and explanatory. Various changes in the details of the illustrative embodiments may be made without departing from the spirit of the invention.

What is claimed is:

1. A method of performing a processing on seismic traces comprising performing a constrained High Resolution Radon decomposition at various frequencies, wherein the Radon decomposition at a given frequency is constrained as a function of the Radon decomposition at at least a lower frequency.

2. A method according to claim 1, wherein a Radon decomposition is successively performed at various sparse frequencies, from the lower frequency to the higher, the Radon decomposition at a given frequency being constrained as a function of the Radon decomposition at the previous frequency.

3. A method according to claim 1, wherein the constrained Radon decomposition is processed using a constrained overdetermined Least-squares solution to the equation:

$$\bar{d}(\omega_k) = G(\omega_k)\bar{q}(\omega_k)$$

with $\omega_i$, the $i^{th}$ frequency component, $\bar{d}(\omega_i)$ the data vector to decompose, $\bar{q}(\omega_k)$, the spectral vector containing the Radon spectral components over which the data vector is decomposed.

4. A method according to claim 2, wherein the constrained Radon decomposition is processed through the determining of the Least-squares solution to the equation:

$$\bar{q} = W(\omega_k)G^H(G^H W(\omega_k)G + \epsilon I)^{-1}G^H \bar{d}$$

with $W(\omega_k)$ a real diagonal positive definite constrain matrix which components are function of at least a frequency lower than $\omega_i$.

5. A method according to claim 4, wherein the constrain matrix $W(\omega_k)$ reads, $$W_{i,i}(\omega_k) = \|q_i(\omega_{k-1})\|.$$

6. A method according to any of the preceding claims, wherein the Radon decomposition is filtered in the Radon domain.

7. A method of performing a processing on seismic traces wherein the method according to any of claims 1 through 5 is applied on sliding temporal and spatial windows.

* * * * *